(12) United States Patent
Brandt et al.

(10) Patent No.: US 6,959,954 B2
(45) Date of Patent: Nov. 1, 2005

(54) VEHICLE TRIM COMPONENT WITH SELF RETAINING FASTENING DEVICE

(75) Inventors: Christopher J. Brandt, White Lake, MI (US); Anthony P. Lipke, Fenton, MI (US)

(73) Assignee: Intier Automotive Inc., Newmarket (CA)

( * ) Notice: Subject to any disclaimer, the term of this patent is extended or adjusted under 35 U.S.C. 154(b) by 94 days.

(21) Appl. No.: 10/282,628

(22) Filed: Oct. 29, 2002

(65) Prior Publication Data

US 2004/0084918 A1 May 6, 2004

(51) Int. Cl.⁷ ................................................. B60R 7/10
(52) U.S. Cl. ..................... 296/1.08; 296/214; 224/313; 248/308
(58) Field of Search ............................... 296/214, 1.07, 296/1.08; 224/313, 553, 282, 927; 248/308, 248/322, 339

(56) References Cited

U.S. PATENT DOCUMENTS

| | | | |
|---|---|---|---|
| 2,059,049 A | | 10/1936 | Smith ........................... 24/213 |
| 3,845,890 A | | 11/1974 | Johns ......................... 224/42.1 |
| 4,720,028 A | * | 1/1988 | Takemura et al. .......... 224/553 |
| 5,411,233 A | | 5/1995 | Grimes, III et al. ........ 248/305 |
| 5,492,260 A | * | 2/1996 | Rieden et al. ............... 224/553 |
| 5,507,423 A | | 4/1996 | Fischer et al. .............. 224/313 |
| 6,003,928 A | | 12/1999 | Curtindale .................. 296/97.9 |
| 6,065,657 A | | 5/2000 | Fischer ....................... 224/313 |
| 6,095,469 A | | 8/2000 | Von Alman ................. 248/304 |
| 6,234,558 B1 | | 5/2001 | Curtindale .................. 296/97.9 |
| 6,315,357 B1 | * | 11/2001 | Johnston ..................... 296/214 |
| 6,422,524 B1 | | 7/2002 | Spagnuolo et al. ......... 248/307 |
| 6,634,693 B2 | * | 10/2003 | Straesser, Jr. ................ 296/70 |
| 6,692,067 B2 | * | 2/2004 | Inari et al. .................. 296/214 |
| 2003/0230044 A1 | * | 12/2003 | Peterson .................... 52/716.5 |

\* cited by examiner

Primary Examiner—Stephen Gordon
(74) Attorney, Agent, or Firm—Honigman Miller Schwartz and Cohn LLP

(57) ABSTRACT

A vehicle trim component includes an integrally formed self retaining fastening device that extends from the vehicle trim component and a passage that permits insertion of a fastener for securing the vehicle trim component to a vehicle structure. The self retaining fastening device further comprises a head portion and a shaft portion. The head portion comprises a rosebud-type fastener surface. The shaft portion extends from the housing and includes at least one row of ribs. The ribs may be angled to provide a relatively lesser amount of force needed for insertion, but a relatively higher amount of force in extraction of the self retaining fastening device. It is emphasized that this abstract is provided to comply with the rules requiring an abstract that will allow a searcher or other reader to quickly ascertain the subject matter of the technical disclosure.

14 Claims, 8 Drawing Sheets

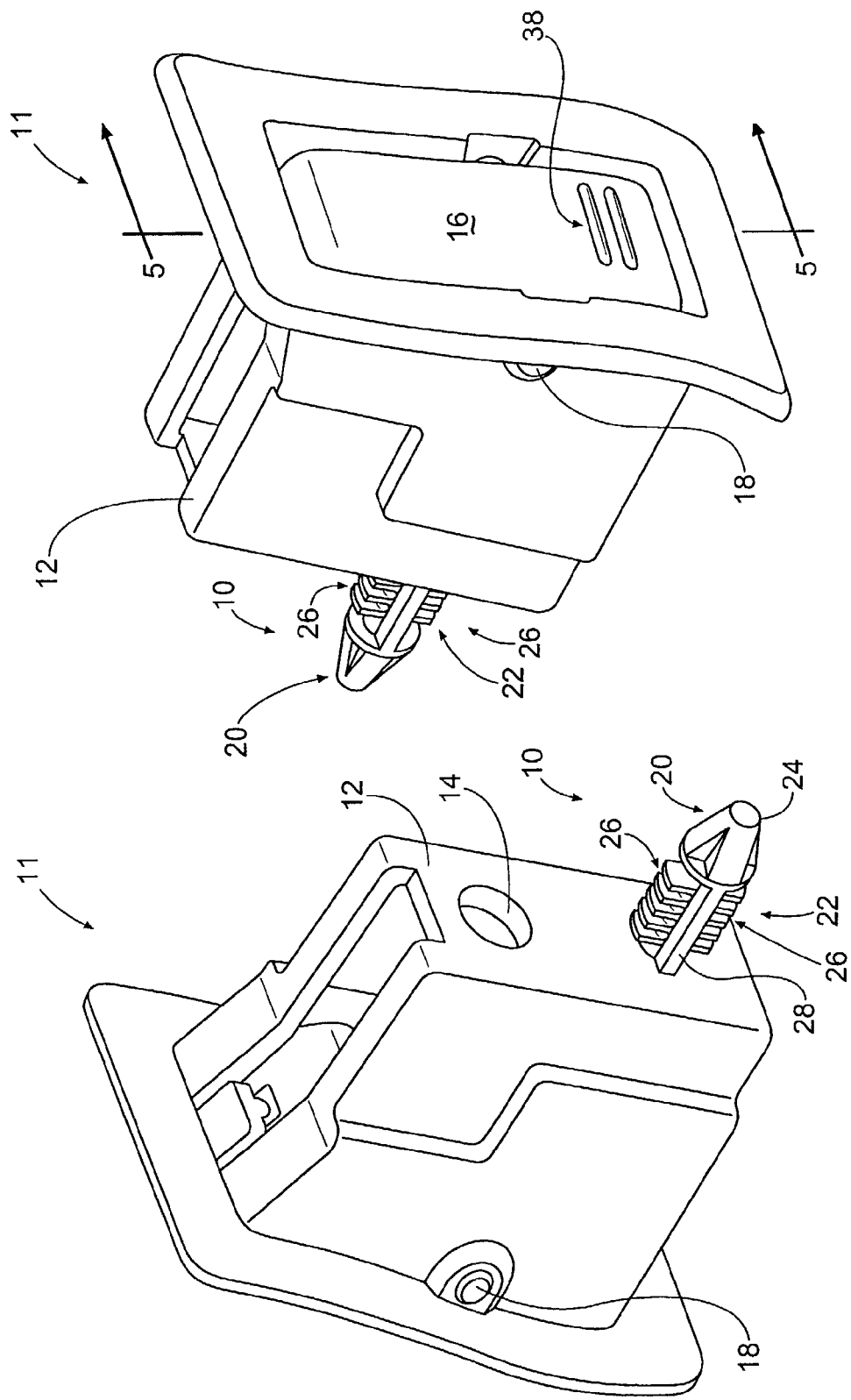

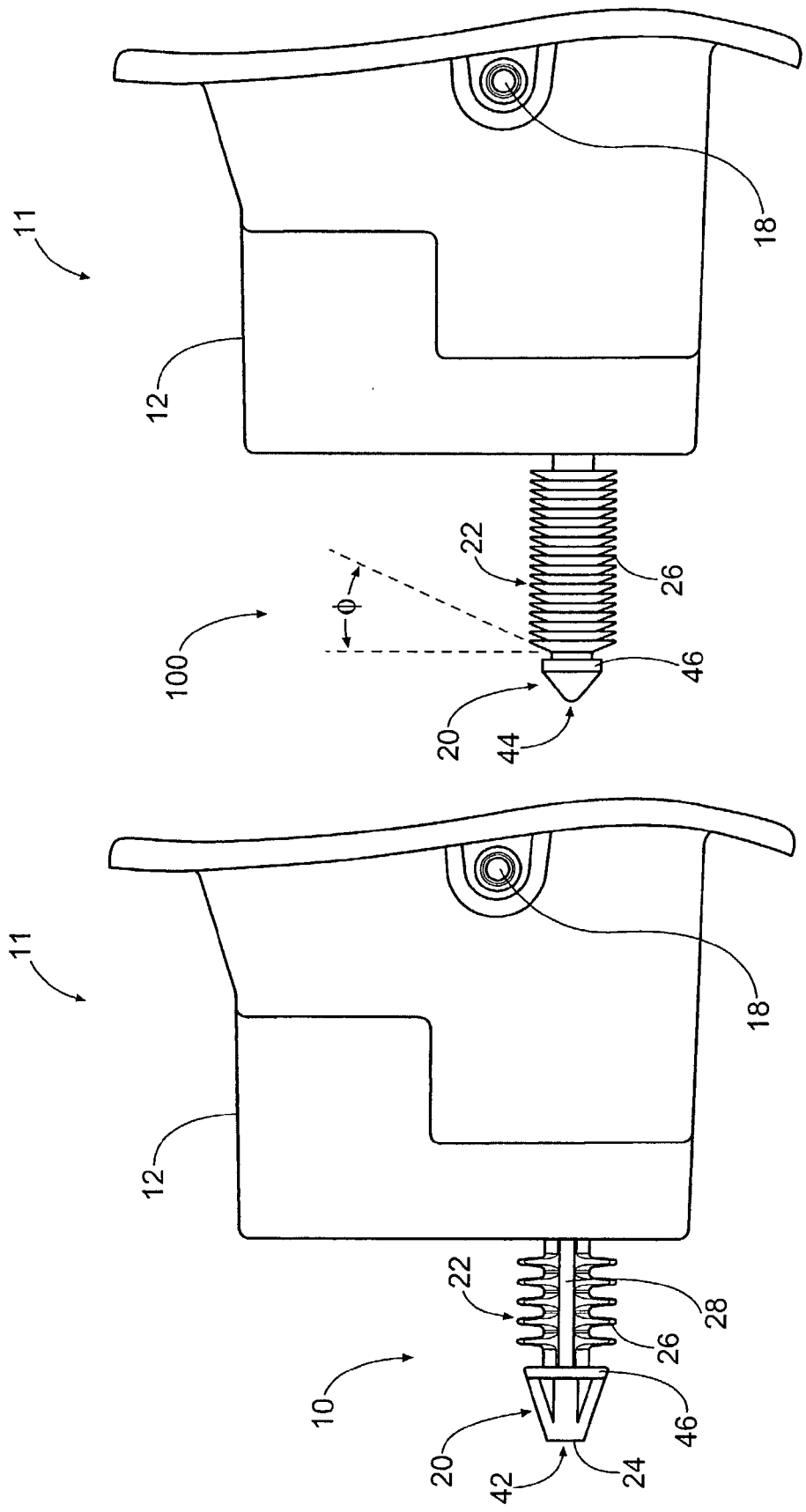

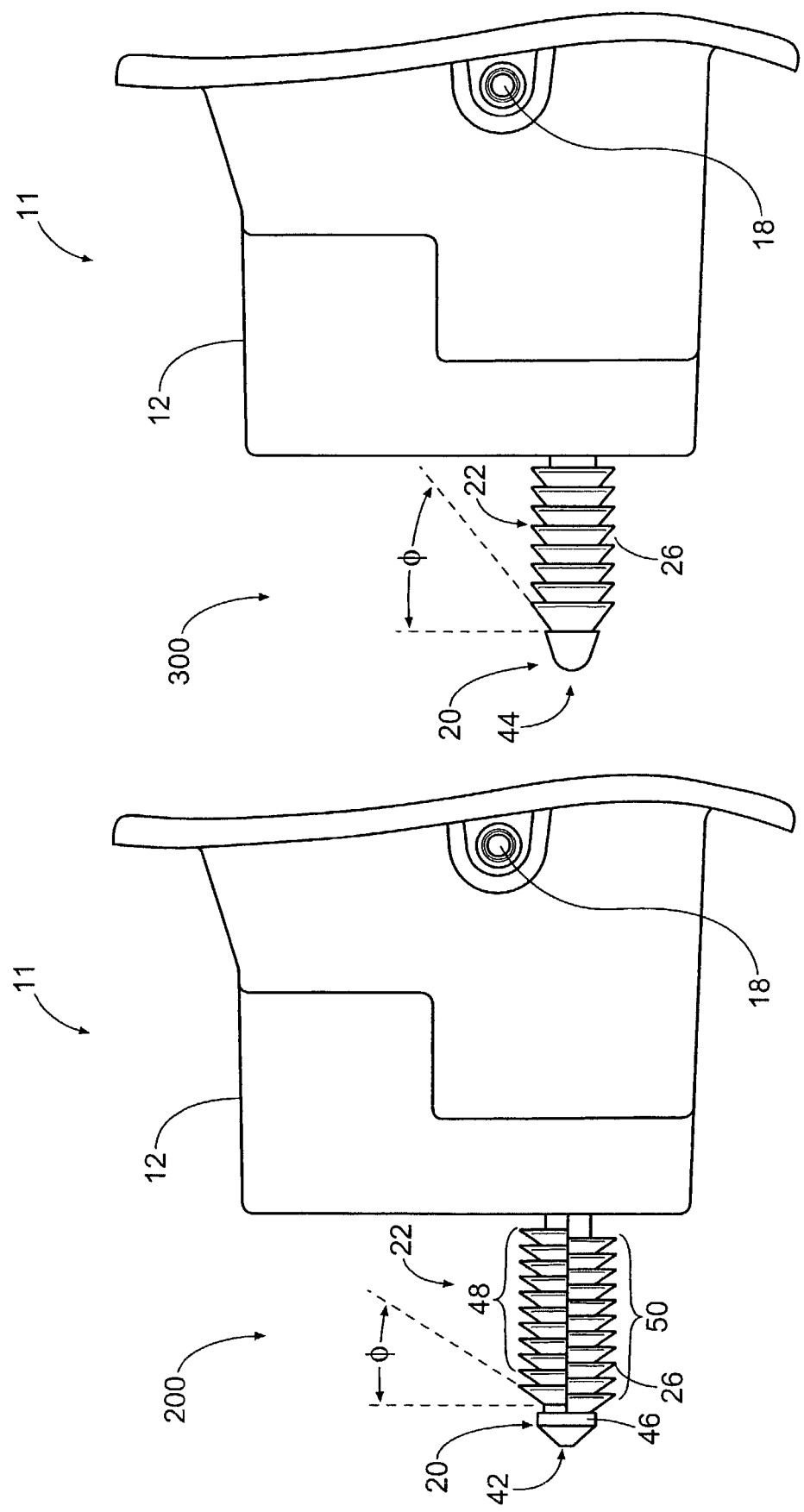

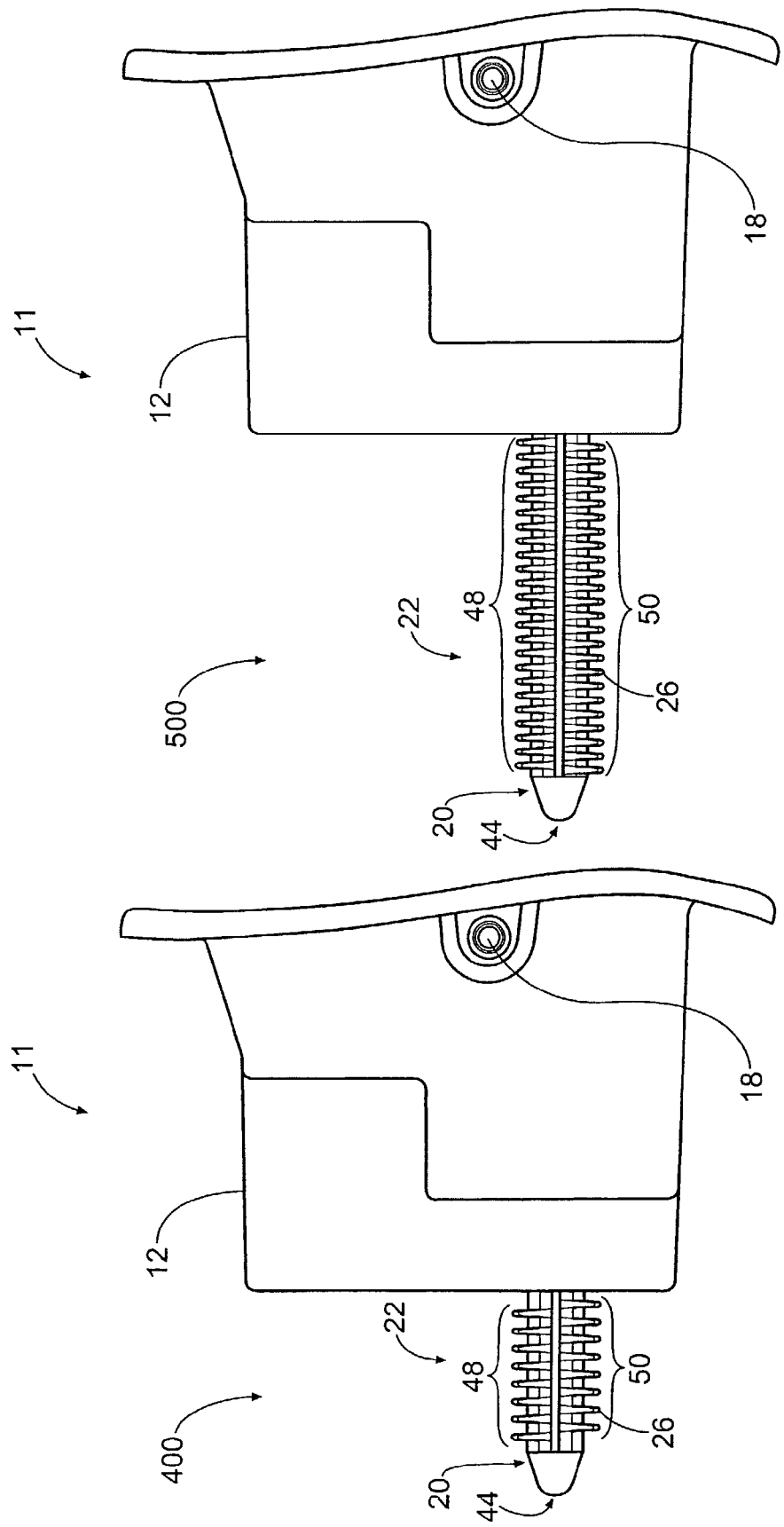

US 6,959,954 B2

VEHICLE TRIM COMPONENT WITH SELF RETAINING FASTENING DEVICE

TECHNICAL FIELD

The present invention relates to interior trim components of a vehicle, and in particular to an interior trim component with an integrally formed self retaining fastening device.

BACKGROUND OF THE INVENTION

It is known that interior trim components for a vehicle may be manually installed at an assembly plant with a fastener. In such situations, it may be difficult for an operator to locate a fastener reception hole in substantially non-visible location in the vehicle, such as, a high, overhead location in a headliner. This situation increases the difficulty of properly securing the trim component in a "blind installation operation" procedure when the trim component may also obstruct the operator's view of the fastener reception hole. Even further, if the fastener reception hole is properly located, the trim component may undesirably rotate about the axis of the fastener, thereby increasing the difficulty in properly installing the trim component.

SUMMARY OF THE INVENTION

The inventors of the present invention have recognized these and other problems associated with blind installation operation procedures and the undesirable rotation of a trim component about the axis of the fastener. To this end, the inventors have developed a vehicle trim component that includes an integrally formed self retaining fastening device and a passage. The self retaining fastening device extends from the vehicle trim component. The self retaining fastening device further comprises a head portion located at an end of a shaft portion. The passage permits the passage of a fastener that secures the vehicle trim component to a vehicle structure.

Another embodiment of the invention is an integrally formed self retaining fastening device that extends from a housing of a garment hook assembly. A pivot extends through the housing, and a garment hook is pivotally secured about the pivot. A passage is formed in the garment hook assembly. The passage permits the passage of a fastener that secures the garment hook assembly to a vehicle structure. The self retaining fastening device includes a head portion located at the end of a shaft portion. The shaft portion is defined by at least one row of ribs that extends from the housing. The head portion comprises a rosebud style fastener surface. The garment hook also comprises a frictional outer surface.

Another embodiment of the invention is an integrally formed self retaining fastening device. The self retaining fastening device comprises means for locating a vehicle body reception hole and means for preventing the rotation of a garment hook assembly about the axis of a fastener.

BRIEF DESCRIPTION OF THE DRAWINGS

The present invention will now be described, by way of example, with reference to the accompanying drawings, in which:

FIG. 1 is a rear perspective view of a self retaining fastening device integrally formed to a vehicle trim component according to one embodiment of the invention;

FIG. 2 is a front rear perspective view of the self retaining fastening device integrally formed to the vehicle trim component of FIG. 1;

FIG. 7A is a side view of a self retaining fastening device of FIG. 1;

FIG. 7B is a side view of a self retaining fastening device according to a second embodiment of the invention;

FIG. 7C is a side view of a self retaining fastening device according to a third embodiment of the invention;

FIG. 7D is a side view of a self retaining fastening device according to a fourth embodiment of the invention;

FIG. 7E is a side view of a self retaining fastening device according to a fifth embodiment of the invention; and FIG. 7F is a side view of a self retaining fastening device according to a sixth embodiment of the invention.

DESCRIPTION OF THE PREFERRED EMBODIMENTS

Figure 3:
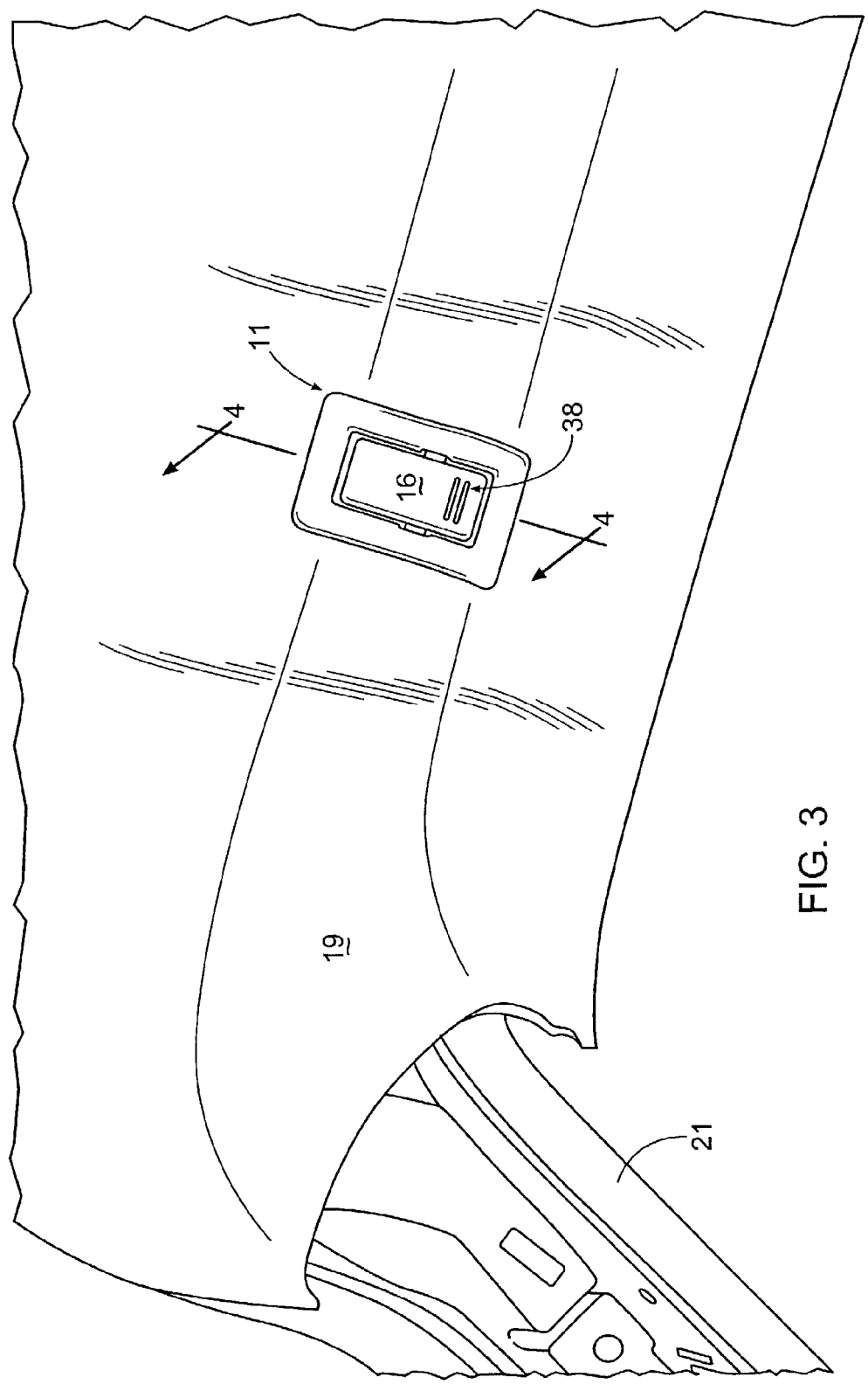
FIG. 3 is a perspective view of the interior trim component of FIG. 1 affixed to a vehicular headliner.

Referring to FIGS. 1 and 2, a self retaining fastening device (SRFD), shown generally at 10, is shown according to a first embodiment of the invention. In the illustrated embodiment, the SRFD 10 is integrally formed with a vehicle trim component, such as a garment hook assembly, shown generally at 11. The SRFD 10 and garment hook assembly 11 may be formed using any desirable method, such as injection molding, or the like. The SRFD 10 and garment hook assembly 11 may be made of any desirable thermoplastic resin, such as, Polypropylene (PP), Acrylnitril-Butadien-Styrol-Copolymere (ABS), Polycarbonate-Acrylnitril-Butadien-Styrol-Copolymere (PC/ABS), Thermoplastic Olefin (TPO), polyvinyl chloride (PVC), or the like. One particular thermoplastic resin that can be used to form the SRFD 10 and garment hook assembly 11 is sold under the tradename ZYTEL®, which is commercially available from the E.I. Du Pont De Nemours and Company Corporation of Wilmington, Del. Alternatively, the SRFD 10 and the garment hook assembly 11 can be made of different materials using a multi-shot molding process.

The SRFD 10 is an integrally formed component that extends from a housing 12 of the garment hook assembly 11. The housing 12 includes an aperture or passage 14 that permits a fastener 13 (FIG. 4) to be inserted through the housing 12 and into a fastener reception hole 17 having a diameter, for example, of approximately 9.0 mm. One aspect of the invention is that the SRFD 10 improves blind installation operation procedures and prevents the undesirable rotation of the garment hook assembly 11 about an axis, A, of the SRFD 10, as shown in FIG. 4 and described below.

In the illustrated embodiment, the garment hook assembly 11 is a three-piece unit that comprises the housing 12, a garment hook 16, and a pivot pin 18. To provide a means for preventing the rotation of the garment hook assembly 11 about the axis, A, of the SRFD 10, the SRFD 10 includes a head portion 20 and a shaft portion 22 extending from the housing 12, as shown in FIGS. 1–2, 5–6, 7A and 7B. In one illustrated embodiment of the invention, the head portion 20 may include an X-shaped surface that resembles a rosebud-type fastener surface 24, and the shaft portion 22 may include one or more row of ribs 26.

The purpose of the rosebud-type fastener surface 24 and the one or more row of ribs 26 is to increase the friction force exerted by the SRFD 10 when inserted into the vehicle body reception hole 15. In addition, the rosebud-type fastener surface 24 and the one or more row of ribs 26 prevent the undesirable rotation of the garment hook assembly 11 about an axis, A, during installation of the SRFD 10. Each row of ribs 26 can comprise a single rib or a plurality of ribs. The SRFD 10 may also include at least one vertical rib 28 that may assist in preventing lateral movement of the garment hook assembly 11 about the vehicle body reception hole 15. The head portion 20 and the shaft portion 22 may have any desirable shape or structure, and, the head portion 20 and the shaft portion 22 are not limited to the illustrated embodiment. For example, the head portion 20 and/or the shaft portion 22 may have a generally smooth surface. Other alternative embodiments of the head and shaft portions 20, 22 of the SRFD 10 are described in more detail below in FIGS. 7B–7F.

Figure 4:
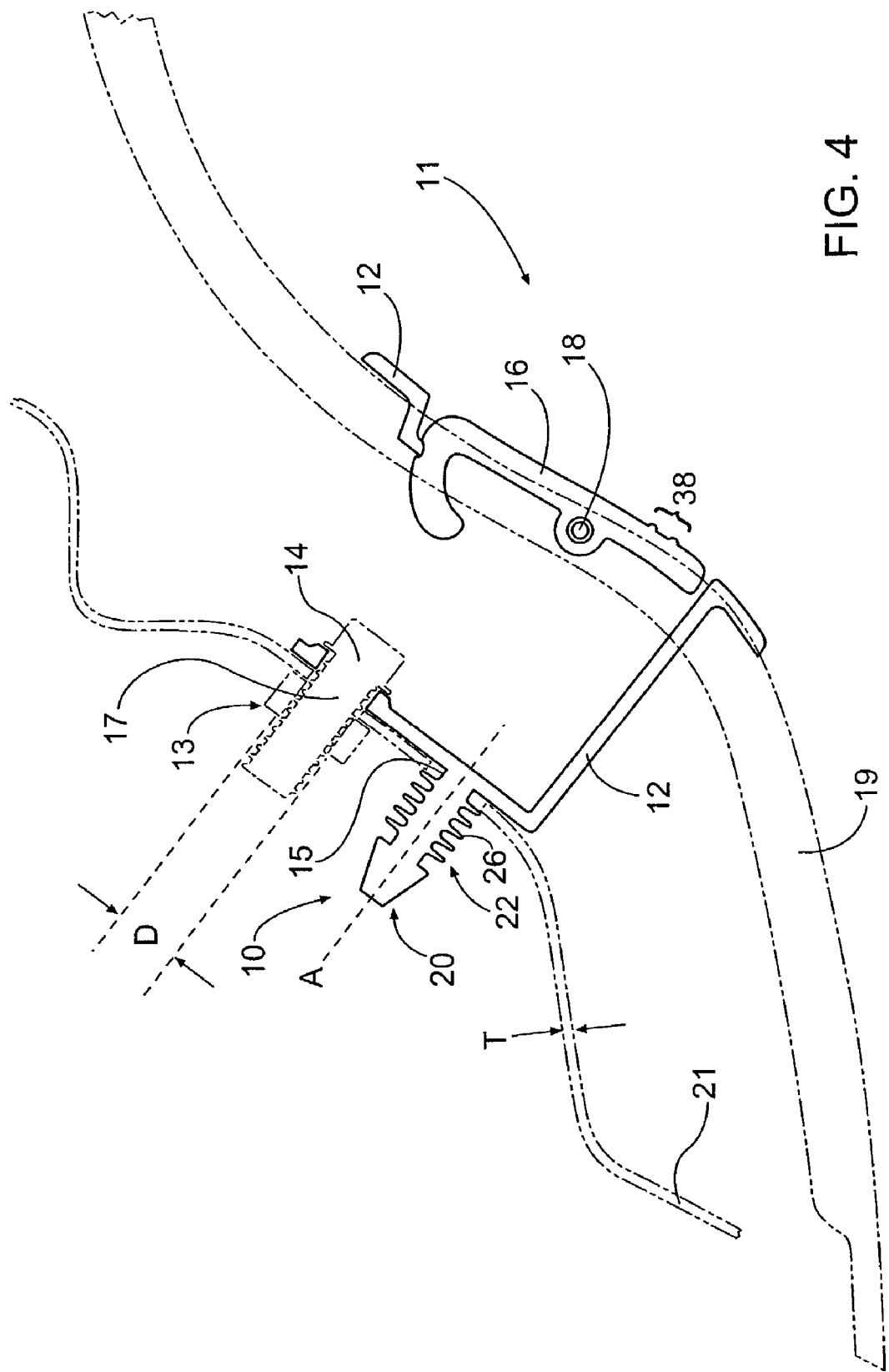
FIG. 4 is a cross-sectional view of the interior trim component affixed to the vehicular headliner taken along line 4—4 of FIG. 3.

Accordingly, as seen in FIGS. 3 and 4, the garment hook assembly 11 is preferably installed in a vehicular headliner 19. Typically, the headliner 19 includes an underlying structure of sheet metal 21 having a thickness, T (FIG. 4), for example, approximately 0.7 mm. Prior to driving the fastener 13 through the fastener reception hole 17, an operator first locates the vehicle body reception hole 15 with the head portion 20. Once the head portion 20 is located about the vehicle body reception hole 15, the operator may selectively drive the shaft portion 22 of the SRFD 10 completely through the vehicle body reception hole 15. Alternatively, the operator may partially drive the shaft portion 22 through the vehicle body reception hole 15. Once the garment hook assembly 11 is retained about the vehicle body reception hole 15 by the SRFD 10, the operator's hands are free to pick up a tool, such as a screw gun (not shown), to drive the fastener 13 through the fastener reception hole 17.

Figure 5:
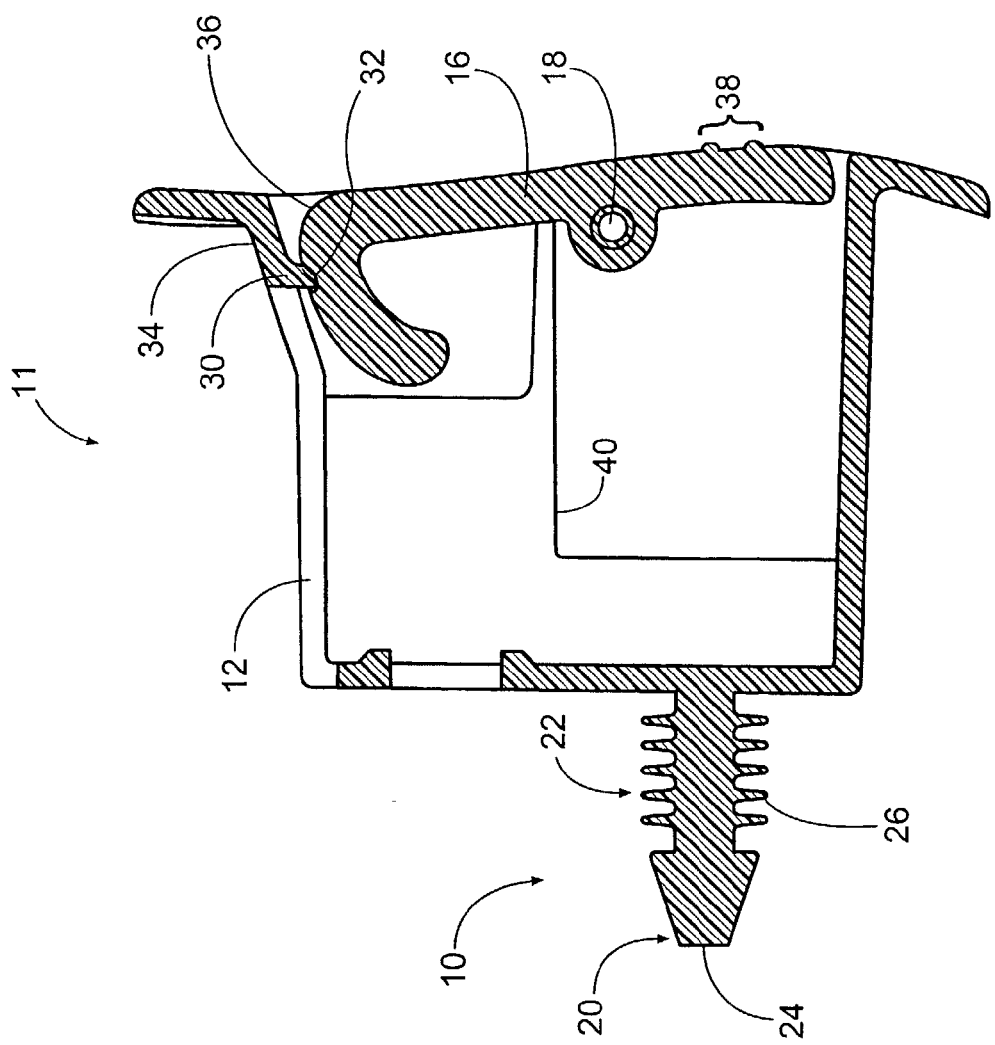
FIG. 5 is a cross-sectional view of the self retaining fastening device integrally formed to the vehicle trim component taken along line 5—5 of FIG. 2.
Figure 6:
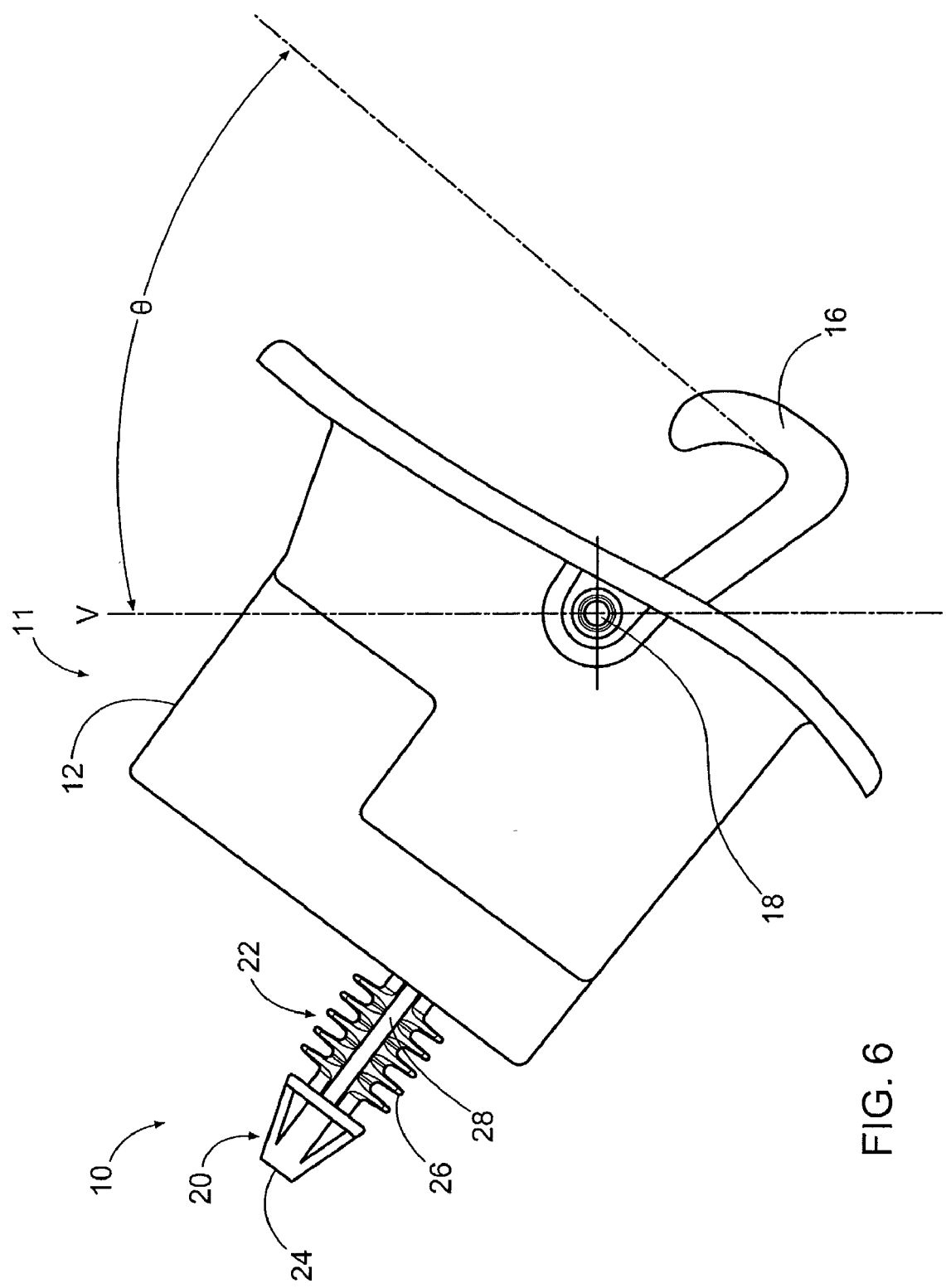
FIG. 6 is a side view illustrating a hook component of the vehicle trim component of FIG. 1 in a deployed position.

Referring to FIGS. 5 and 6, once the garment hook assembly 11 is installed in a vehicle, a user may deploy the garment hook 16 about the pivot 18 to and from a stowed position (FIG. 5) and in-use position (FIG. 6). Accordingly, when not in use, the garment hook 16 may be pivoted in the stowed position. The garment hook 16 may be held in the stowed position by a lip 30 that engages a detent 32. According to the illustrated embodiment, the lip 30 extends from a top 34 of the housing 12, and the detent 32 is located at a bottom 36 of the garment hook 16. However, this feature of the garment hook assembly 11 is not limited to the illustrated embodiment, and the lip 30 may alternatively extend from the bottom 36 of the garment hook 16, and the detent 32 may be located at the top 34 of the housing 12. The garment hook 16 may also include a frictional outer surface 38 that assists in facilitating deployment of the garment hook 16.

As illustrated in FIG. 6, the garment hook 16 may be fully deployed at any desirable angle, θ. The fully-deployed angle, θ, is referenced from a vertical axis, V, that is perpendicular to the vehicle base pan (not shown). The fully-deployed angle, θ, is determined by the design and positioning of a stop member 40 (FIG. 5) that is located within the interior of the housing 12. Once the garment hook 16 is in the fully deployed position, the garment hook 16 may receive garment hangers or other items that are traditionally hung from the garment hook 16. The garment hook assembly 11 is designed to include a load capacity that may receive and withstand a pull force of at least 45 pounds. However, if desired, the garment hook assembly 11 may withstand higher loads, such as 100 pounds, by using stronger materials that comprises the garment hook 16, pivot 18 and stop member 40. Alternatively, the garment hook assembly 11 may withstand higher loads by also increasing the thickness, T, of the sheet metal 21.

Referring now to FIGS. 7B–7F, alternative embodiments of the SRFD 10 are shown in greater detail at reference numerals 100, 200, 300, 400, and 500, respectively. The head and shaft portions 20, 22 are designed to reduce the insertion and extraction effort of an operator during an installation or service operation. As seen in FIGS. 7A, and 7C, the head portion 20 includes a generally flat tip 42; conversely, the embodiments seen in FIGS. 7B, 7D, 7E, and 7F have a generally smooth, curved tip 44. As seen in FIGS. 7B and 7C, the head portion may also include an axial neck portion 46.

As illustrated in FIGS. 7A–7F, the ribs 26 comprise a variety of alternative designs that are defined to comprise varying degrees insertion or extraction efforts. For example, as seen in FIGS. 7A, 7E, and 7F, the ribs 26 axially extend from the shaft portion 22 at approximately 0 degrees, resulting in the same degree of effort needed for insertion or extraction. Alternatively, as seen in FIGS. 7B–7D, the ribs 26 extend from the shaft portion 22 at a desirable angle, φ, resulting in a lesser amount of force needed for insertion, but a higher amount of force in extraction. Accordingly, as the angle, φ, is increased, the extraction effort for inserting the garment hook assembly 11 is decreased proportionally. Even further, in another alternative embodiment as seen in FIGS. 7C, 7E, and 7F, the ribs 26 may axially extend from the shaft in an offset configuration. More specifically, a first row of ribs 48 may be vertically offset by a second row of ribs 50.

Essentially, the embodiments of the SRFD 10, 100, 200, 300, 400, and 500 described above improves blind installation operation procedures and prevents the undesirable rotation of a vehicular trim component about the axis of a fastener. The embodiments of the SRFD 10, 100, 200, 300, 400, and 500 also permits an operator to locate and place the vehicular trim component about a reception hole in order to free the operator's hands for driving a fastener with a screw gun through a fastener reception hole. Although the invention as described above is shown for a garment hook assembly, the invention may also apply to any vehicular trim component that is typically installed in a "blind installation operation" procedure.

While the invention has been specifically described in connection with certain specific embodiments thereof, it is to be understood that this is by way of illustration and not of limitation, and the scope of the appended claims should be construed as broadly as the prior art will permit.

What is claimed is:

1. A garment hook assembly, comprising:
a housing having a passage;
a garment hook pivotally mounted to said housing; and
a self retaining fastening device extending from and integrally formed with the housing of the garment hook assembly, the self retaining fastening device including a shaft portion for locating and retaining the garment hook assembly while a fastener is inserted into the passage of the housing for securing the garment hook assembly to a vehicle structure.

2. The garment hook assembly according to claim 1, wherein the garment hook further comprises a frictional outer surface.

3. The garment hook assembly according to claim 2, wherein the self retaining fastening device further comprises a head portion defining a rosebud-type fastener surface.

4. The garment hook assembly according to claim 2, wherein the shaft portion extends from the housing, wherein the shaft portion further comprises at least one row of ribs.

5. The garment hook assembly according to claim 4, wherein the shaft portion further comprises at least one vertical rib.

6. The garment hook assembly according to claim 4, wherein the shaft portion comprises a first row of ribs and a second row of ribs, the first row of ribs being axially offset from the second row of ribs.

7. The garment hook assembly according to claim 4, wherein the at least one row of ribs extends axially from the shaft portion at an angle greater than approximately zero degrees.

8. The garment hook assembly according to claim 4, wherein the at least one row of ribs extends axially from the shaft portion at an angle of approximately zero degrees.

9. The garment hook assembly according to claim 2, wherein the garment hook may be fully deployed at an angle that is determined by a stop member that is located within an interior of the housing.

10. A vehicle trim component, comprising:
an integrally formed self retaining fastening device that extends from a housing of a garment hook assembly, wherein the self retaining fastening device further comprises a head portion located at an end of a shaft portion that is defined by at least one row of ribs that extends from the shaft portion, wherein the head portion comprises a rosebud fastener surface;
a pivot that extends through the housing;
a garment hook that is pivotally secured about the pivot, wherein the garment hook comprises a frictional outer surface; and
a passage that is formed in the vehicle trim component for permitting the insertion of a fastener for securing the vehicle trim component to a vehicle structure.

11. The vehicle trim component according to claim 10, wherein the at least one row of ribs is further defined by a first row of ribs and a second row of ribs, the first row of ribs being axially offset from the second row of ribs.

12. The vehicle trim component according to claim 10, wherein the at least one row of ribs extend axially from the shaft portion at an angle greater than zero degrees.

13. The vehicle trim component according to claim 10, wherein the at least one row of ribs axially extend from the shaft portion at zero degrees.

14. The vehicle trim component according to claim 10, wherein the garment hook may be fully deployed at an angle tat is determined by a stop member located within an interior of the housing.

* * * * *

UNITED STATES PATENT AND TRADEMARK OFFICE
CERTIFICATE OF CORRECTION

PATENT NO. : 6,959,954 B2
DATED : November 1, 2005
INVENTOR(S) : Chris Brandt

It is certified that error appears in the above-identified patent and that said Letters Patent is hereby corrected as shown below:

Column 6,
Line 25, delete "tat" and insert -- that --.

Signed and Sealed this

Third Day of January, 2006

JON W. DUDAS
*Director of the United States Patent and Trademark Office*